United States Patent [19]
Dwork et al.

[11] Patent Number: 6,126,203
[45] Date of Patent: *Oct. 3, 2000

[54] MACHINE-READABLE CHECKS

[75] Inventors: Cynthia Dwork, Palo Alto, Calif.; Moni Naor, Tel Aviv, Israel; Florian Pestoni, Buenos Aires, Argentina

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/814,249

[22] Filed: Mar. 11, 1997

[51] Int. Cl.$^7$ .................................................. B42D 15/00
[52] U.S. Cl. ........................... 283/58; 235/379; 235/384; 283/57; 283/59; 283/70; 380/24; 380/25
[58] Field of Search ................................ 283/57–59, 70; 380/24, 25; 235/379, 384

[56] References Cited

U.S. PATENT DOCUMENTS

| | | | |
|---|---|---|---|
| 4,667,985 | 5/1987 | Leonard et al. | 283/58 |
| 4,868,877 | 9/1989 | Fischer . | |
| 4,948,174 | 8/1990 | Thomson et al. | 283/58 |
| 5,121,945 | 6/1992 | Thompson et al. | 283/58 |
| 5,187,351 | 2/1993 | Clary | 235/379 |
| 5,326,959 | 7/1994 | Perazza | 235/379 |
| 5,433,483 | 7/1995 | Yu | 283/58 |
| 5,441,309 | 8/1995 | D'Alessio et al. | 283/58 |
| 5,470,160 | 11/1995 | Nowlin | 400/105 |
| 5,489,763 | 2/1996 | Conrad et al. | 235/384 |
| 5,490,217 | 2/1996 | Wang et al. | 380/51 |
| 5,509,692 | 4/1996 | Oz | 283/70 |
| 5,594,226 | 1/1997 | Steger | 235/379 |
| 5,673,320 | 9/1997 | Ray et al. | 380/25 |
| 5,677,955 | 10/1997 | Doggett et al. | 380/24 |
| 5,740,271 | 4/1998 | Kunkler et al. | 283/58 |

FOREIGN PATENT DOCUMENTS 0 214 629 A2   3/1986   European Pat. Off. .

OTHER PUBLICATIONS

"An Efficient Existentially Unforgeable Signature Scheme and its Applications" by Cynthia Dwork and Moni Naor, Advances in Cryptology—CRYPTO '94, 14th Annual International Cryptology Conference Santa Barbara, California, Aug. 21–25, 1994, Springer–Verlag.

*Primary Examiner*—Willmon Fridie, Jr.
*Assistant Examiner*—Monica Smith
*Attorney, Agent, or Firm*—Morgan & Finnegan LLP

[57] ABSTRACT

A machine-readable check comprising a check and a machine-readable image block printed on the check. Preferably, the image block is a two-dimensional print code.

19 Claims, 14 Drawing Sheets

MACHINE-READABLE CHECKS

FIELD OF THE INVENTION

The present invention relates to secure, error-correcting encoding of machine-readable information on checks.

BACKGROUND OF THE INVENTION

Checks are a widely used form of payment for both business and personal transactions. Although electronic payments have gained significant acceptance for business transactions, checks are still much more widely used for personal transactions. However, many checks require at least some manual processing, which increases the cost of using checks. Automated equipment to read the payer bank routing number and the payer account number has been in use for some time. Automated equipment to read other information from the checks, such as hand-written or even printed payee or amount is still unreliable in operation, requiring manual correction or entry of such information.

At the same time, the writing of checks has become increasingly automated. Businesses have used computer-generated checks for some time. Recently, financial software for personal computers has gained the capability to generate personal checks. The information printed on such computer generated checks cannot reliably be read by computer. Printed information on checks which could be reliably read by computer would allow complete automation of the check handling process and decrease the cost of such check handling.

SUMMARY OF THE INVENTION

The present invention is a method and system to generate checks on which all relevant information, such as payer, payee, amount, etc., is encoded on the check in machine readable form. The encoding is error-correcting so that blemishes due to damage to a check do not prevent recovery of the encoded information. A human-readable version of the encoded information is also printed on the check. The present invention is also applicable to other types of negotiable instruments.

DETAILED DESCRIPTION OF THE INVENTION

Figure 1:
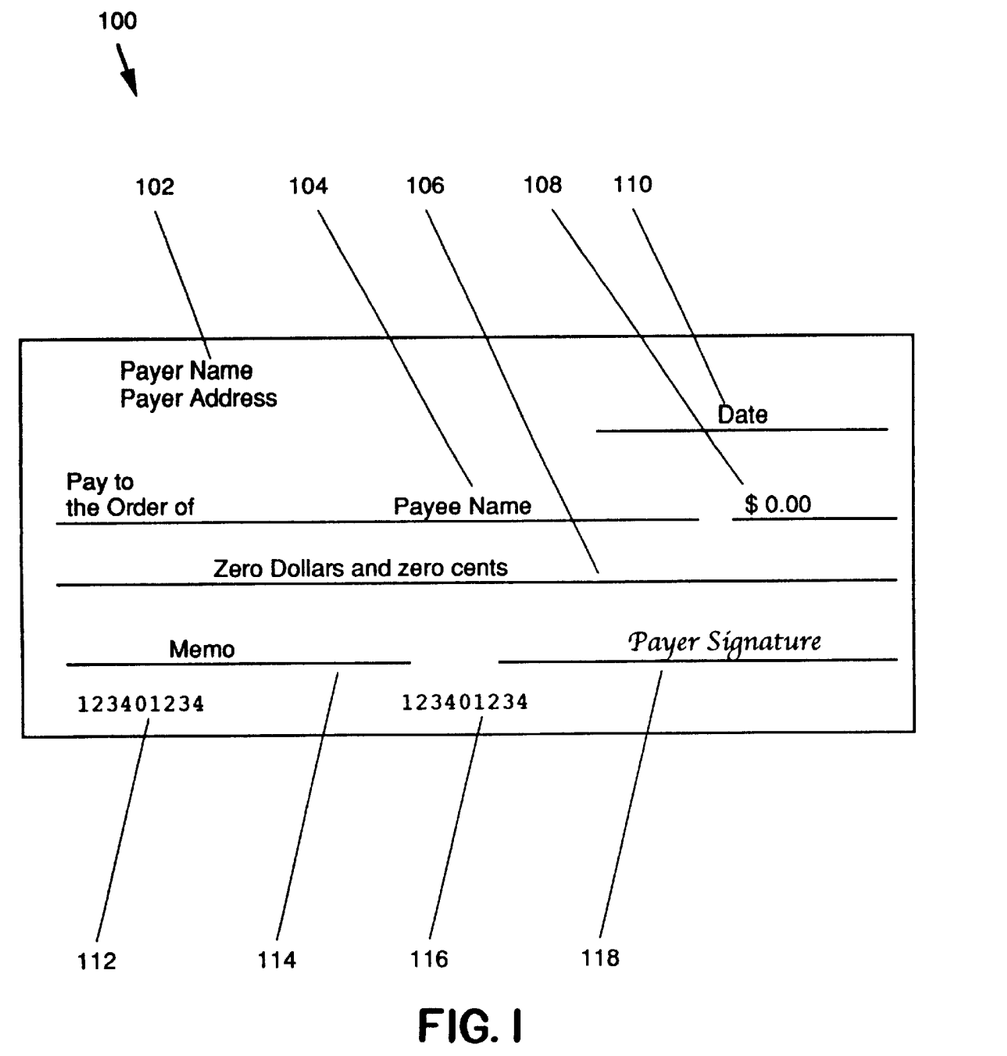
FIG. 1 is a representation of a standard check, as is now in use.

A standard check 100, as shown in FIG. 1, contains a number of information fields which are filled in. For example, checks contain the payer's name and address 102, the payee's name 104, the amount to be paid, represented numerically in field 108 and textually in field 106, the date 110, the payer's signature 118, the payer bank routing number 112, and the payer's account number 116 and possibly a memo field 114. At present, only the payer bank routing number 112, the payer's account number 116 can reliably be read automatically.

Figure 2A:
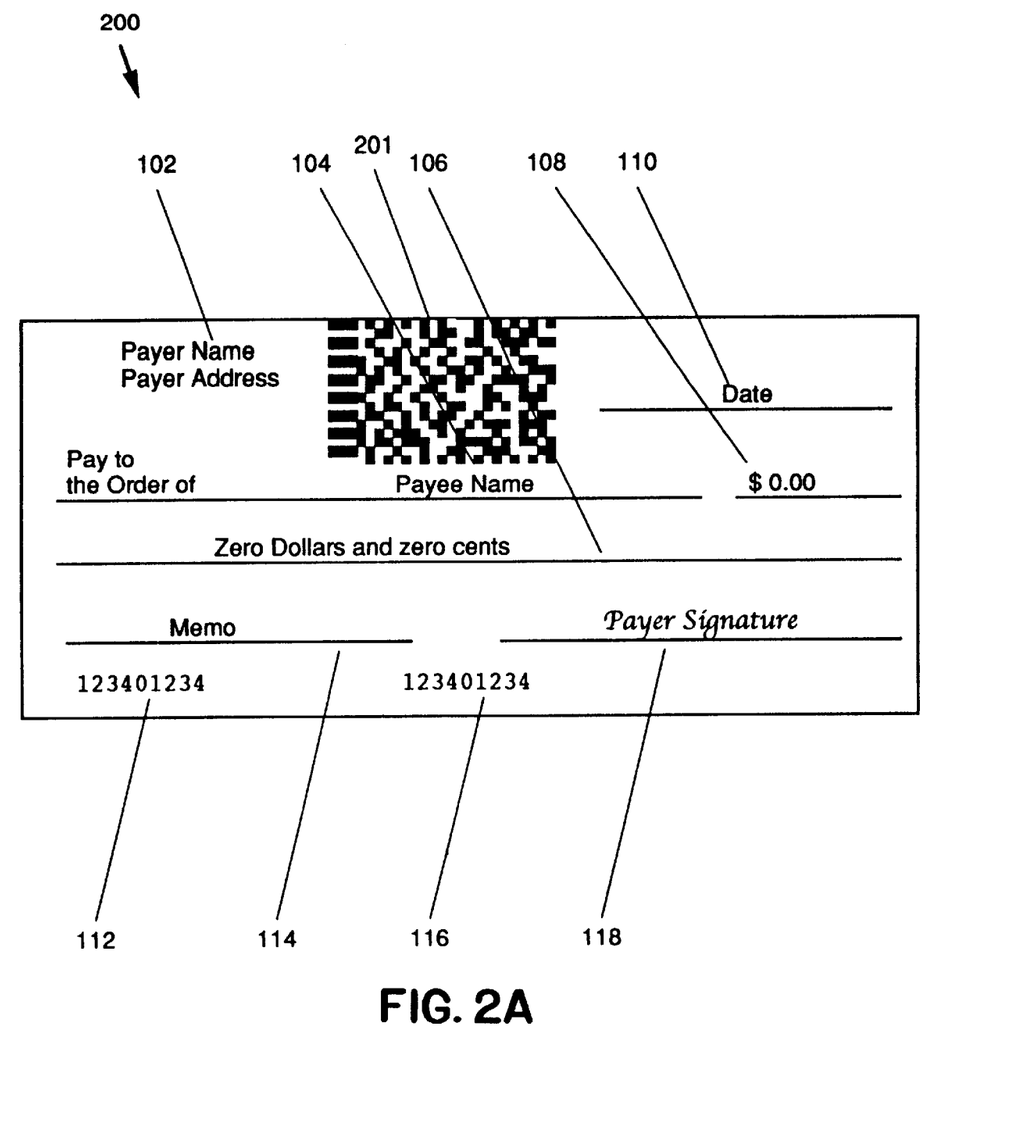
FIG. 2a is a representation of a check in accordance with one embodiment of the present invention, which contains machine readable information and human readable information.

A check 200, shown in FIG. 2a, in accordance with one embodiment of the present invention, has on it some or all of the human readable information of a standard check and machine readable image block 201. Image block 201 contains all relevant information, such as payer name, payee name, amount, payer account number, payer bank routing number, etc. Image block 201 may also contain an electronic signature or other validation information. Image block 201 is preferably encoded using a two-dimensional array code described in U.S. Pat. No. 5,778,011, which is hereby incorporated by reference. This array code is preferred because it provides good error protection and increased efficiency over other array codes. However, the present invention may use any two-dimensional array code which provides adequate protection against random and cluster errors and is sufficiently efficient that its encoded output fits in the available space. For example, the print code described by U.S. Pat. No. 5,153,928, issued to Iizuka on Oct. 6, 1992 may be used. An array code, when printed on a medium such as a paper check, is known as a print code. In the context of the present invention, the terms array code and print code are interchangeable.

Image block 201 may be included on any type of negotiable instrument. The transaction costs involved with such instruments may be substantially reduced by an automated negotiation process using the present invention.

Figure 2B:
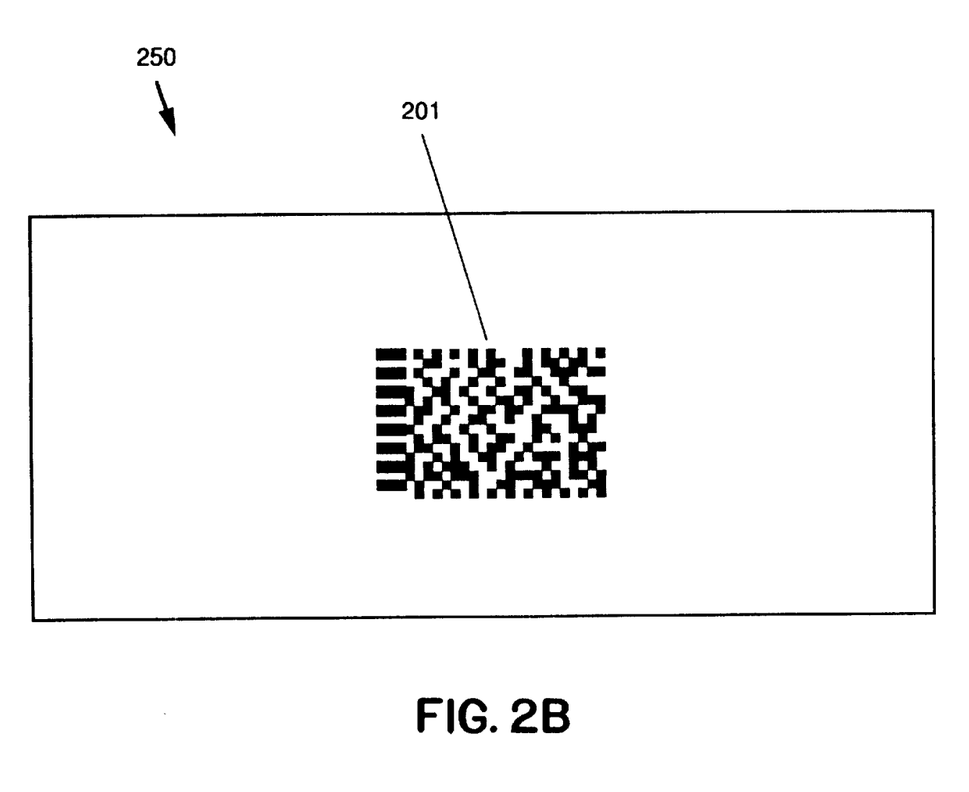
FIG. 2b is a representation of a check in accordance with another embodiment of the present invention, which contains only machine readable information.

A check or other negotiable instrument 250, shown in FIG. 2b, in accordance with another embodiment of the present invention, contains only machine readable image block 201.

Figure 3A:
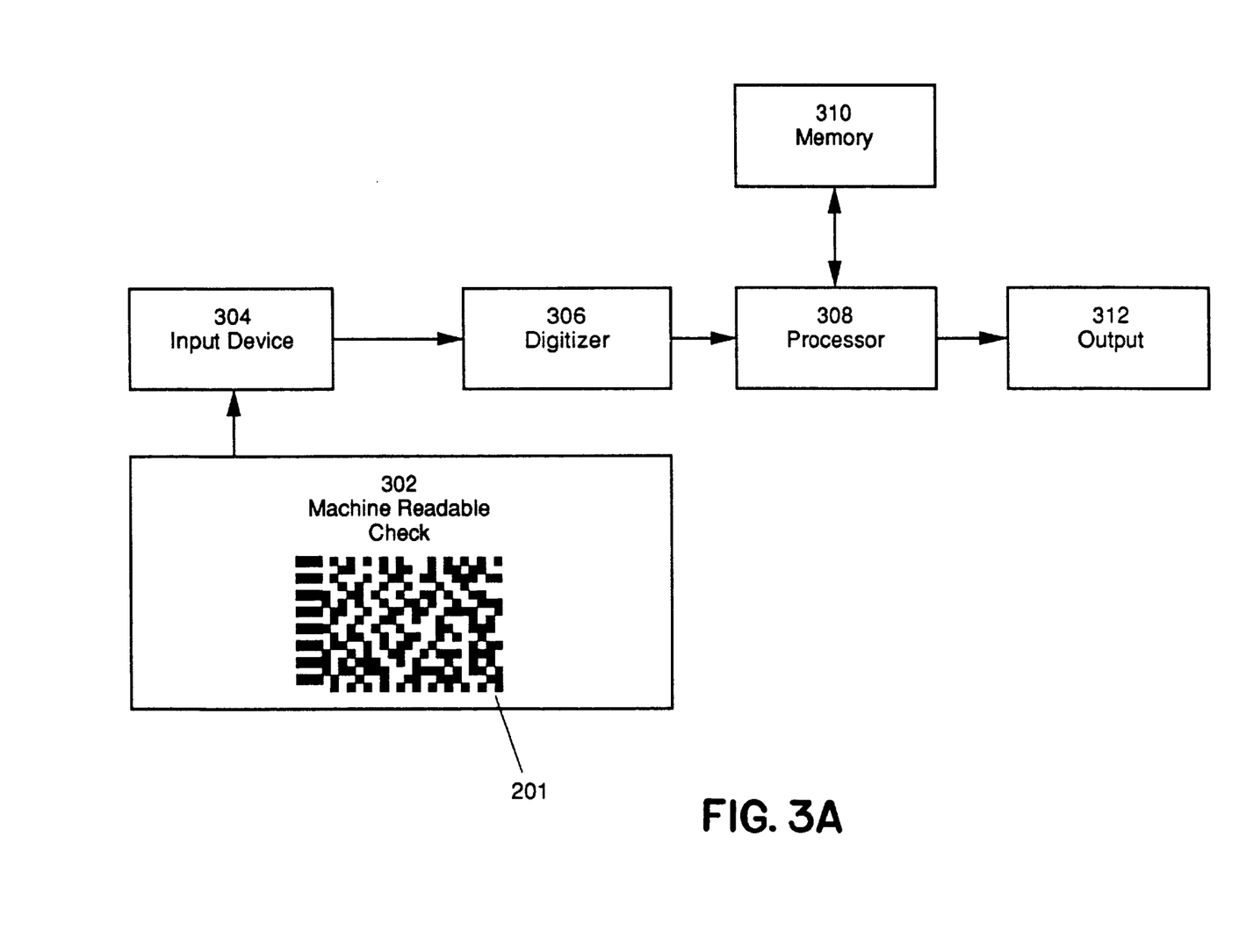
FIG. 3a is a block diagram of a system for reading machine readable checks in accordance with the present invention.

A system for reading machine readable checks in accordance with the present invention is shown in FIG. 3. An input device 304 reads information from machine readable check 302. Input device 304 may be any conventional device that is capable of generating an output signal that represents a characteristic of a point in space, such as a conventional optical scanner which is capable of representing the amount of light reflected from particular locations on a sheet of paper as an electrical signal. Machine readable check 302 is a check such as that shown in FIG. 2a or FIG. 2b, which includes an image block 201 containing a two-dimensional print code.

If the input device 304 provides an analog signal, then a digitizer 306 converts the analog output from the input device 304 into a digital signal. For example, in one embodiment of the present invention, the input device 304 is a conventional optical scanner that outputs an analog voltage that is proportional to the amount of light reflected from a piece of paper placed in close proximity to the optical scanner. The output signal from the optical scanner is synchronized to a scan signal to indicate the relative location on the image-block 201 associated with the voltage level being output at a particular time. The digitizer 306 receives the output signal from the scanner and converts the output signal into a digital data stream that can be processed conventionally. The digital data stream output from the digitizer 306 is coupled to a processor 308. The processor 308 is coupled to a conventional memory device 310 and an output device 312, such as a printer, magnetic write head, optical write head, etc. In accordance with the present invention, the processor 308 may be a programmable microprocessor or other programmable computing device, a state machine, or dedicated hardware. The memory 310 may be any means for storing information, such as a magnetic data storage device, random access memory fabricated in a semiconductor integrated circuit, dynamic random access memory, optical memory device, or any other means for storing information.

Figure 3B:
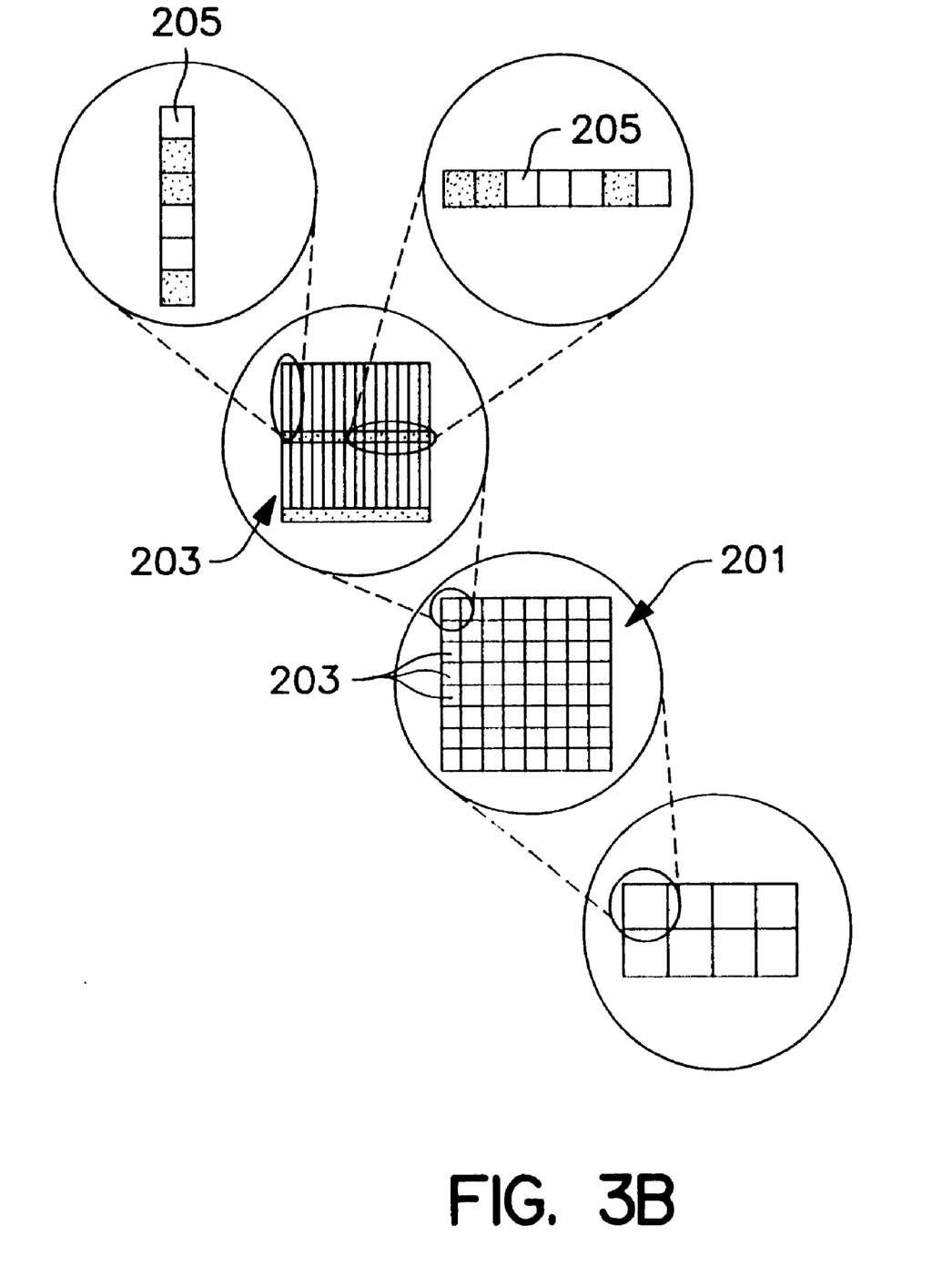
FIG. 3b is an illustration of an image block of a two-dimensional array code in accordance with one embodiment of the present invention.

FIG. 3b is an illustration of one embodiment of an image-block which may be used in the present invention. The image-block is a two dimensional array in which information is encoded, such a two-dimensional print code. Print codes communicate information between a print medium, such as paper, and a computer in the manner described above with respect to FIG. 3a.

Figure 4:
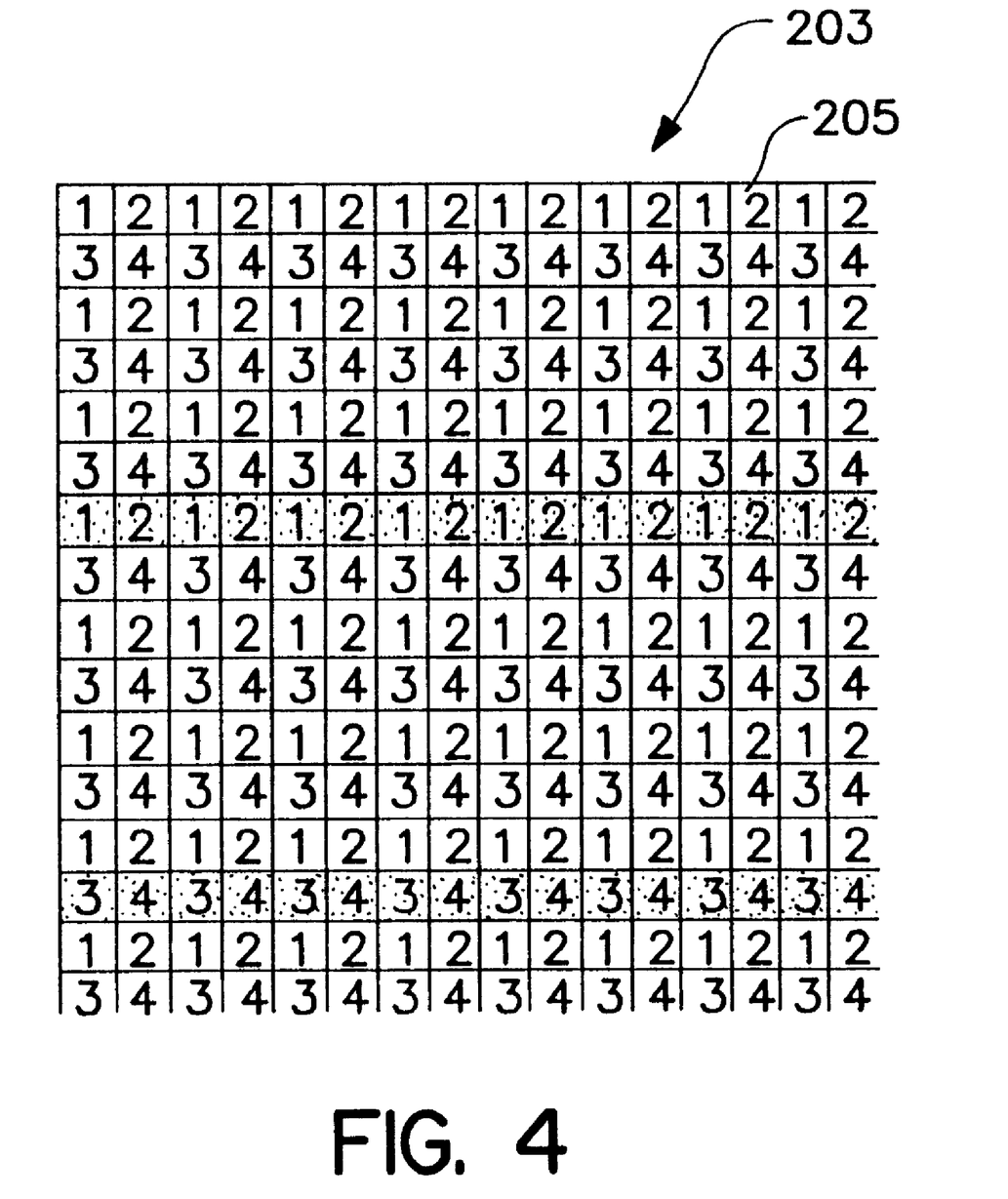
FIG. 4 is an illustration of one embodiment of a sub-block of the image block of FIG. 3b.
Figure 5:
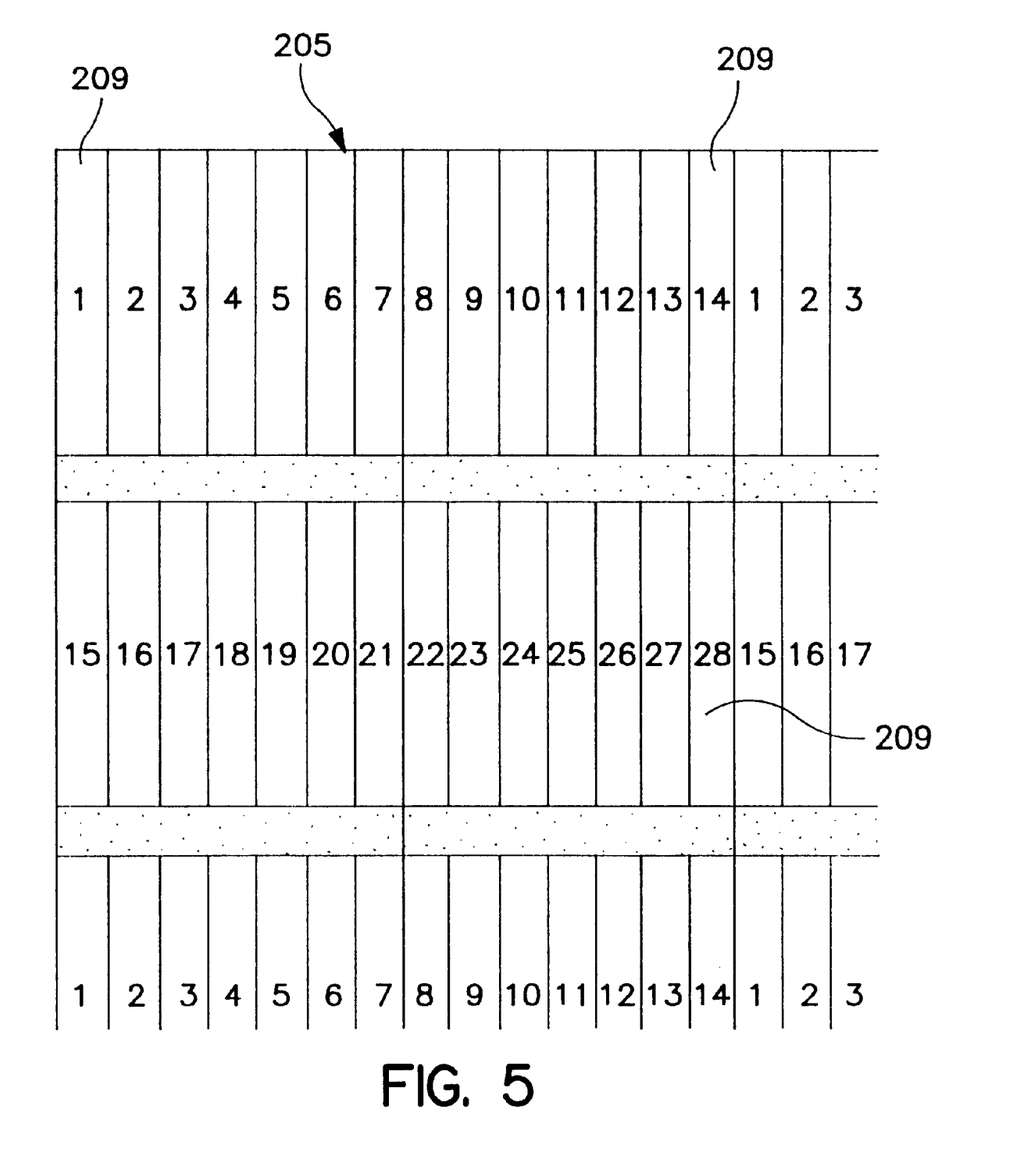
FIG. 5 is an illustration of another embodiment of a sub-block of the image block of FIG. 3b.

In the embodiment shown in FIG. 3b, the image-block 201 comprises a plurality of "sub-blocks" 203. In the print code used in the preferred embodiment of the present invention, the dimensions of each sub-block are identical. Each sub-block 203 preferably comprises a plurality of contiguous modules 205. In particular, the image-block 201 of FIG. 3a has 64 sub-blocks 203. Each sub-block has 196 modules 205 configured in a two-dimensional 14×14 array. FIGS. 4 and 5 illustrate a sub-block 203 in greater detail. In the embodiment illustrated in FIGS. 4 and 5, each of the modules 205 is essentially square. In an alternative embodiment, modules 205 have other predetermined shapes, such as are generally circular, triangular, octagonal, etc. Each of the modules 205 preferably represents one bit of information (i.e., represents one of two states). Alternatively, each module 205 can represent more than one bit. For example, each module 205 can be either black or white if each module represents a binary bit of data. This embodiment is preferred. Alternatively, each module 205 may be printed in one color from among a finite set of possible colors where each color represents the state of three binary bits. Accordingly, in one embodiment, red is defined as a member of the set of possible colors and represents a corresponding binary state "010". Since binary states are typically used to represent data within digital computers, the binary states represented by each module 205 of the image-block 201 can be mapped into a unit of data within a data structure stored in a computer. For simplicity, the illustrated embodiments of the present invention have modules 205 that represent binary states. More specifically, each module 205 of the illustrated embodiment is either black or white, where black represents a first logical state, such as "1", and white represents a second logical state, such as "0". Accordingly, the 196 modules 205 shown in FIGS. 4 and 5 can represent 196 binary bits of data. Each image-block 201 can record 12,544 bits of data.

In accordance with the present invention, data that are to be recorded in the image-block 201 are encoded in both "inner codewords" and "outer codewords". The inner codewords may be any of the well-known error correction codewords, such as codewords of a Hamming [49,42] code. Each inner codeword is preferably completely contained within one sub-block 203 associated with that codeword. In an alternative embodiment, the inner codewords may be recorded in a relatively small number of sub-blocks 203. In the preferred embodiment of the present invention, the information in each sub-block 203 is encoded in more than one inner codeword. The modules that comprise each codeword are "interleaved" within the sub-block 203 in order to provide the most robust error correction system possible. For example, in one embodiment of the present invention in which a Hamming [49,42] code is used, the codewords are 49 units long in order to convey information that is encoded in 42 of those units. The remaining 7 units carry "redundancy" information that is necessary for error detection and correction. Each of the 49 modules 205 marked "1" is part of the first codeword. Each of the 49 modules 205 marked "2" is part of the second codeword, etc. In the embodiment of the present invention shown in FIGS. 3–5, the seven redundancy modules are preferably located in the 7th and 14th rows (shown in shading in FIGS. 4 and 5). By separating the redundancy information, space can be allocated for the redundancy information when outer codewords are being generated, as will be made clear below. In the case in which a Hamming [49,42] code is used, the state of a module 205 that has been corrupted can always be recovered if no more than one module from the same codeword is corrupted. Accordingly, the interleaving scheme shown in FIG. 4 allows any one group of four modules 205 which form a 2×2 square within each sub-block 203 to be corrupted without a loss of information.

The use of inner codewords protects data from being lost if relatively small scattered random errors are generally evenly distributed over the entire image-block. That is, data can be recovered using only the inner codewords if no more than one group of 2×2 modules are corrupted within each sub-block 203. Any four modules that are each from a different codeword can be corrected even if they do not form a 2×2 square. The most likely case is that more than one contiguous module will be corrupted at a time. However in many cases, small scattered random errors are likely to only affect four modules at most. That is, a defect that is smaller than one module may affect more than one module by occurring on a border between modules. However, in order to affect more than four modules, the defect must be larger than one module in at least one dimension.

The ability to correct small scattered random errors is advantageous, since a number of small scattered errors can accumulate in codewords that are spread out over relatively large areas, overwhelming the codeword and making it impossible to correct the errors. Because the inner codewords are relatively small (i.e., are spread over relatively little area), fewer errors will occur in each inner codeword. However, if only the inner codewords were provided, a more catastrophic error in which more than four modules 205 are corrupted would cause information to be lost. In addition, in cases in which more than the statistically predicted number of small scattered errors occur in any one codeword, data could be lost. In accordance with one embodiment of the present invention, a second level of protection is provided by the outer codewords to prevent such losses. The outer codewords allow larger cluster errors (i.e., errors as large as one entire sub-block) to be corrected.

FIG. 5 illustrates the way the outer codewords are interleaved among a plurality of sub-blocks 203 in accordance with one embodiment of the present invention. Each set of six modules (marked "1" through "28") form one byte 209 of a unique outer codeword. Accordingly, in the embodiment of the present invention shown in FIG. 5, there are 28 outer codewords in the image-block 201. In accordance with the illustrated embodiment, each of the 28 codewords is a Reed-Solomon code having 64 six-module bytes. One six-module byte from each of the 28 codewords is located in each of the 64 sub-blocks 203 of the image-block 201. By providing an outer codeword, the information in each of the other 63 sub-blocks 203 can be used to recover the corrupted information, even if a relatively large number of modules (or all) of the modules in any one of the sub-blocks 203 is corrupted. The inner codewords work together with the outer codewords to provide a system in which small scattered errors which generally occur relatively frequently can first be corrected using the inner codewords. Once the inner codewords are used to recover from the small scattered errors, outer codewords are used to recover information that is corrupted by larger, but less frequent errors. A 64 byte long codeword carries 62 bytes of data and 2 bytes of redundancy information. Therefore, in accordance with the illustrated embodiment of the present invention shown in FIGS. 3–5, an image-block 201 can hold up to 28×6×62 modules of data, since there are 28 six-module bytes in each of the 62 sub-blocks 203 that hold non-redundancy information. Accordingly, a 10 Kbyte file can be encoded using 8 image-blocks 201 arranged in an array of 2×4 modules, as shown in FIG. 3.

Figure 6:
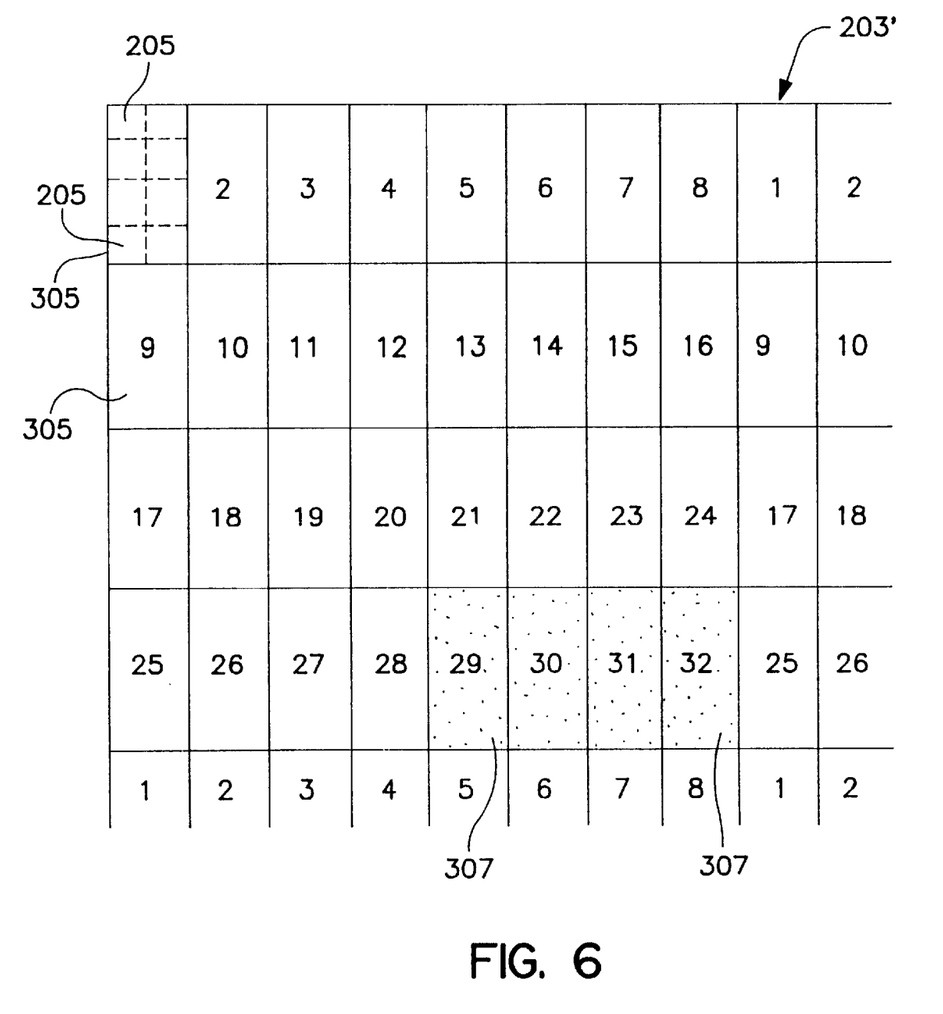
FIG. 6 is an illustration of another embodiment of a sub-block of the image block of FIG. 3b.
Figure 7:
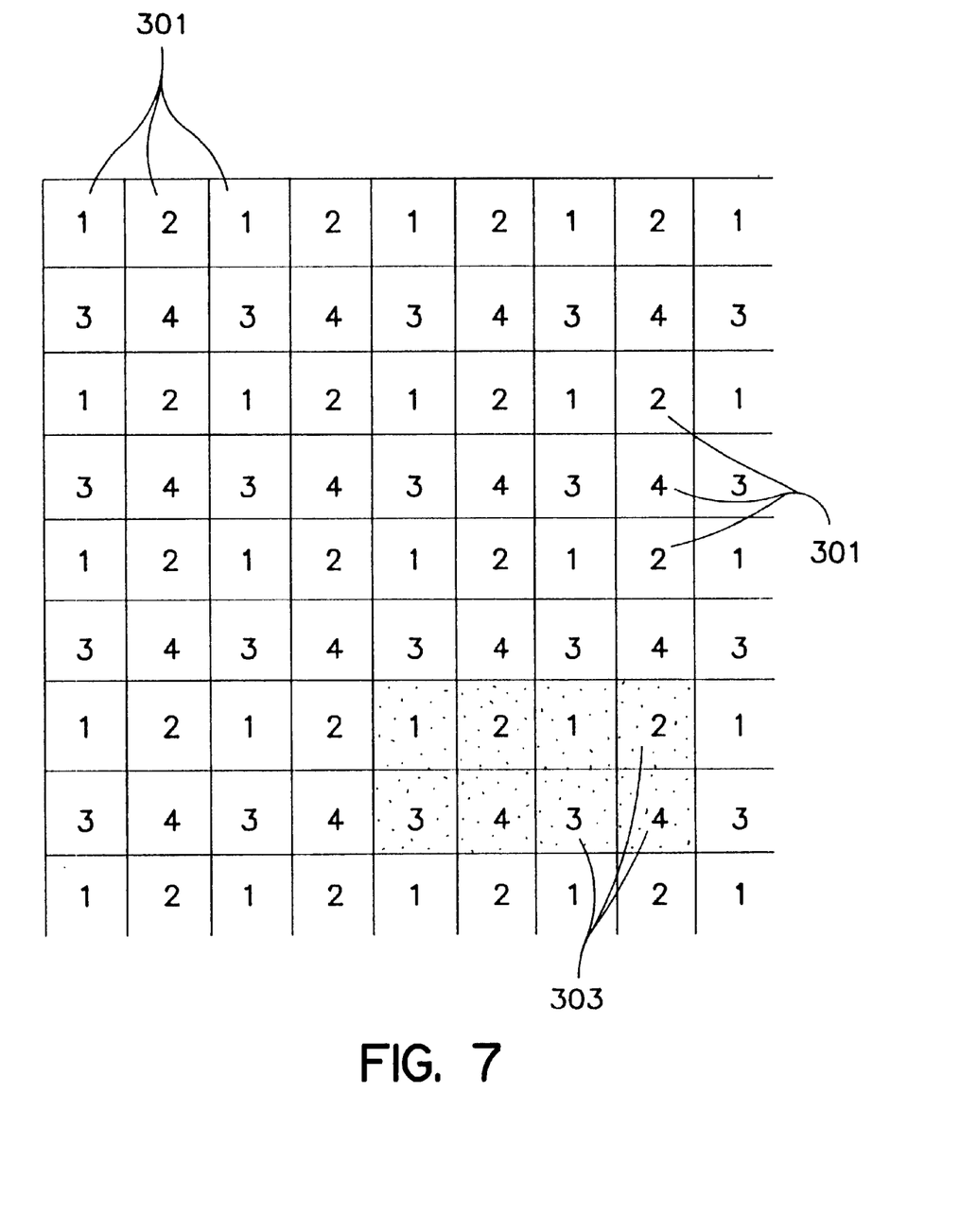
FIG. 7 is an illustration of another embodiment of a sub-block of the image block of FIG. 3b.
Figure 8:
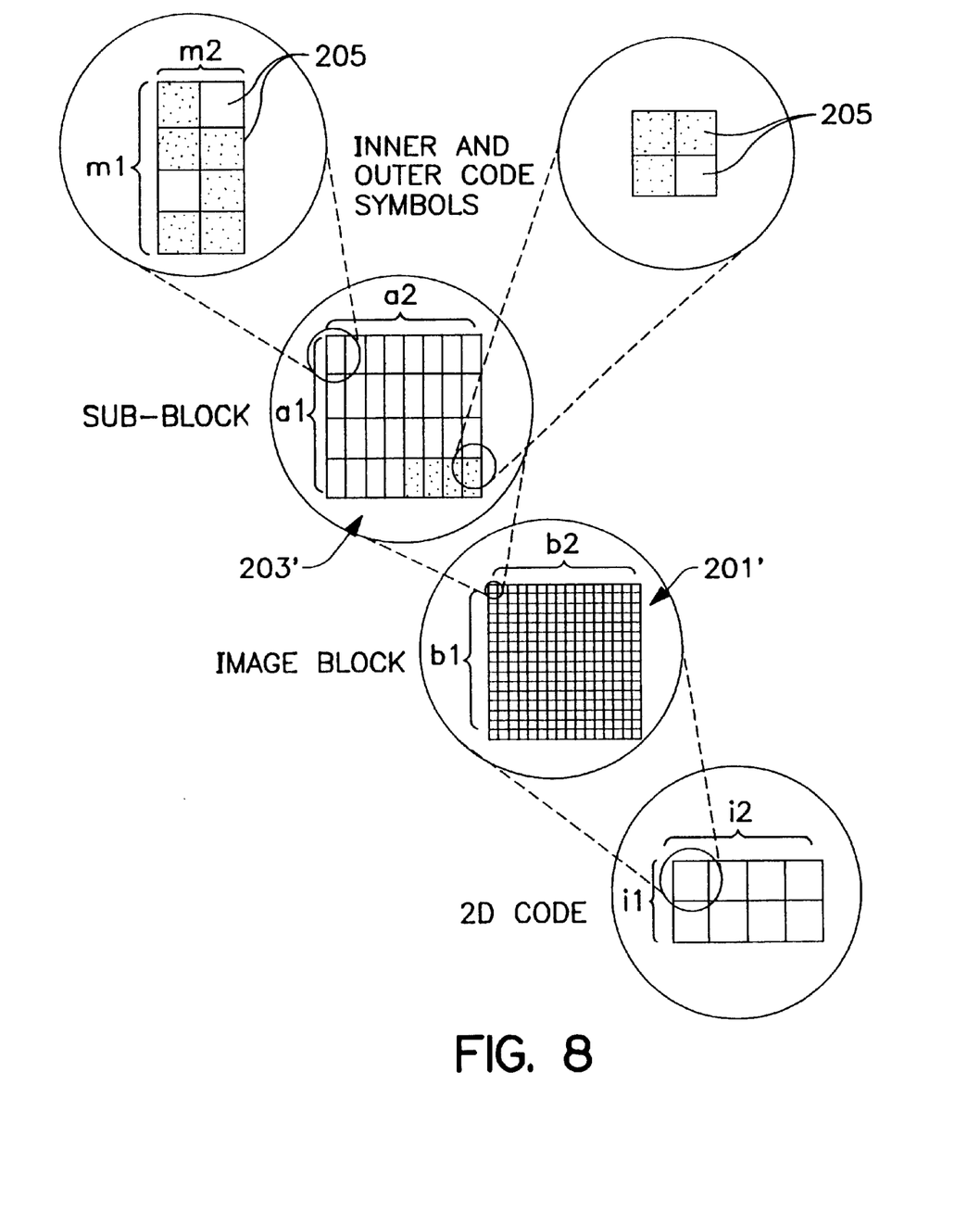
FIG. 8 is an illustration of an image block comprising the sub-blocks of both FIG. 6 and FIG. 7.

In one alternative embodiment of the present invention shown in FIGS. 6–8, both the inner and outer codewords are Reed-Solomon codes. For example, FIG. 6 shows each sub-block 203' having, 28 bytes 305, each byte 305 being a 2×4 array of modules. The sub-block 203' is a 16×16 module array. Each of these bytes 305 is associated with a unique outer codeword. Each outer codeword is preferably a Reed-Solomon [256,254] codeword over the Galois field GF ($2^8$).

A section of each sub-block 203' (such as the 4 bytes 307 shown in shading in the bottom right corner of FIG. 6) is reserved for the redundancy information for an inner Reed-Solomon codeword. For example, in the embodiment of the present invention shown in FIG. 7, the 256 modules 205 in each sub-block 203' are viewed as sixty-four 2×2 arrays 301. Each 2×2 array 301 represents a 4-module byte of a Reed-Solomon code in the Galois field GF ($2^4$). The data in each of the 2×2 arrays 301 is encoded into 4 Reed-Solomon [16,14] (extended) codewords. The two redundancy bytes (i.e., two redundancy symbols in 2×2 module arrays) of each of the 4 four codewords are recorded in the array of 4×8 modules 303 located in the bottom right corner of the sub-block 203' (shaded area of FIGS. 6 and 7). Each of the other bytes 301 of the four inner codewords are interleaved as shown in FIG. 7, such that any group of inner codeword bytes 301 that form a 2×2 square includes one byte 301 from each of the four inner codewords. That is, each byte 301 marked "1" in FIG. 7 is part of the first inner codeword, each byte 301 marked "2" is part of the second inner codeword, etc. Accordingly, the bytes of each inner codeword are spaced apart from each of the other bytes of the same inner codeword. As illustrated in FIG. 8, each image-block 201' includes an array of 16×16 sub-blocks 203'. An image-block 201' includes 28 outer codewords (as best seen in FIG. 5). Each of the 28 outer codewords has a total length of 16×16×2×4 modules (i.e., one 2×4 module byte in each of the 16×16 sub-blocks).

Figure 9A:
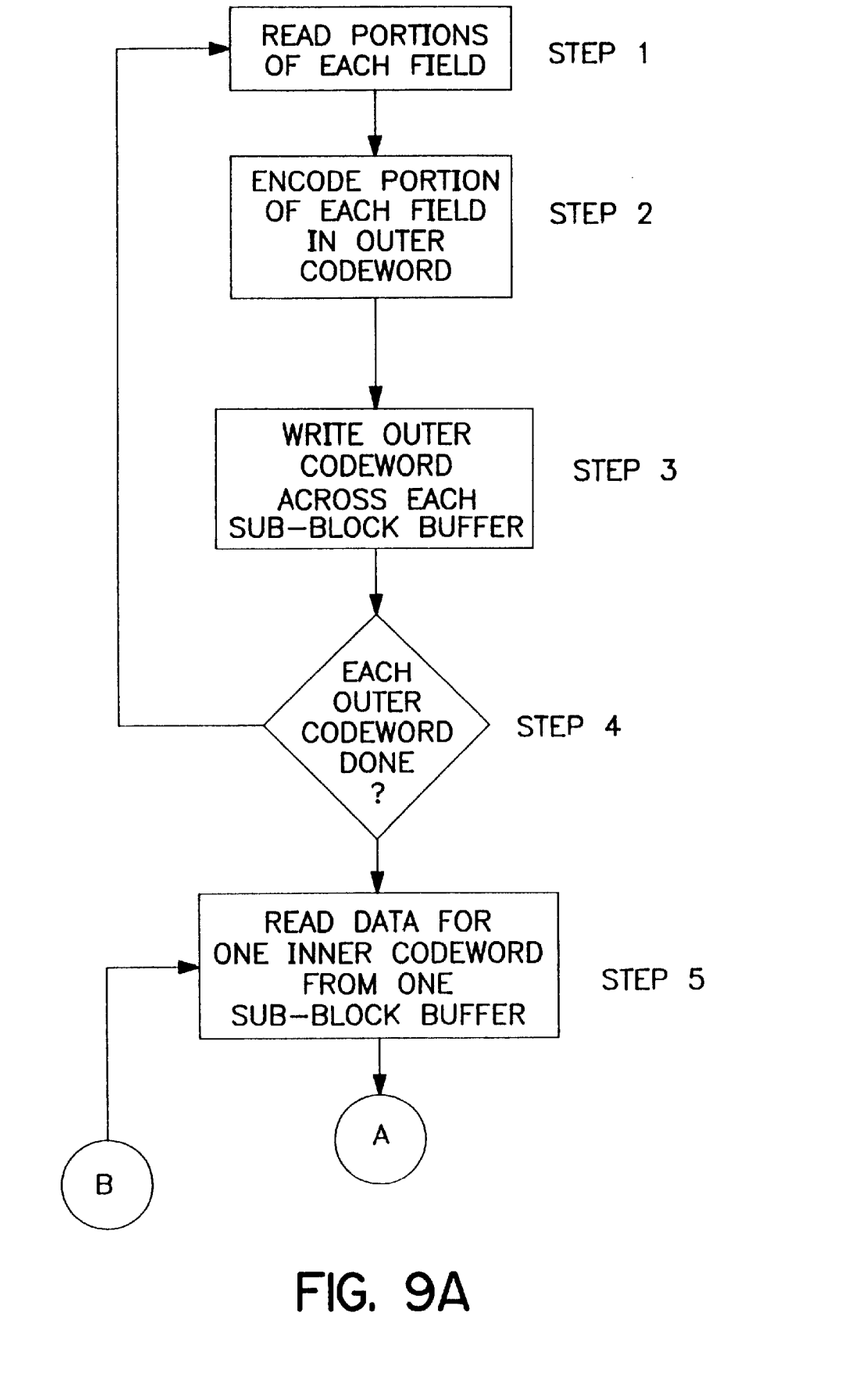
FIG. 9a is a flow diagram of a portion of a process of generating a print code in accordance with the present invention.
Figure 9B:
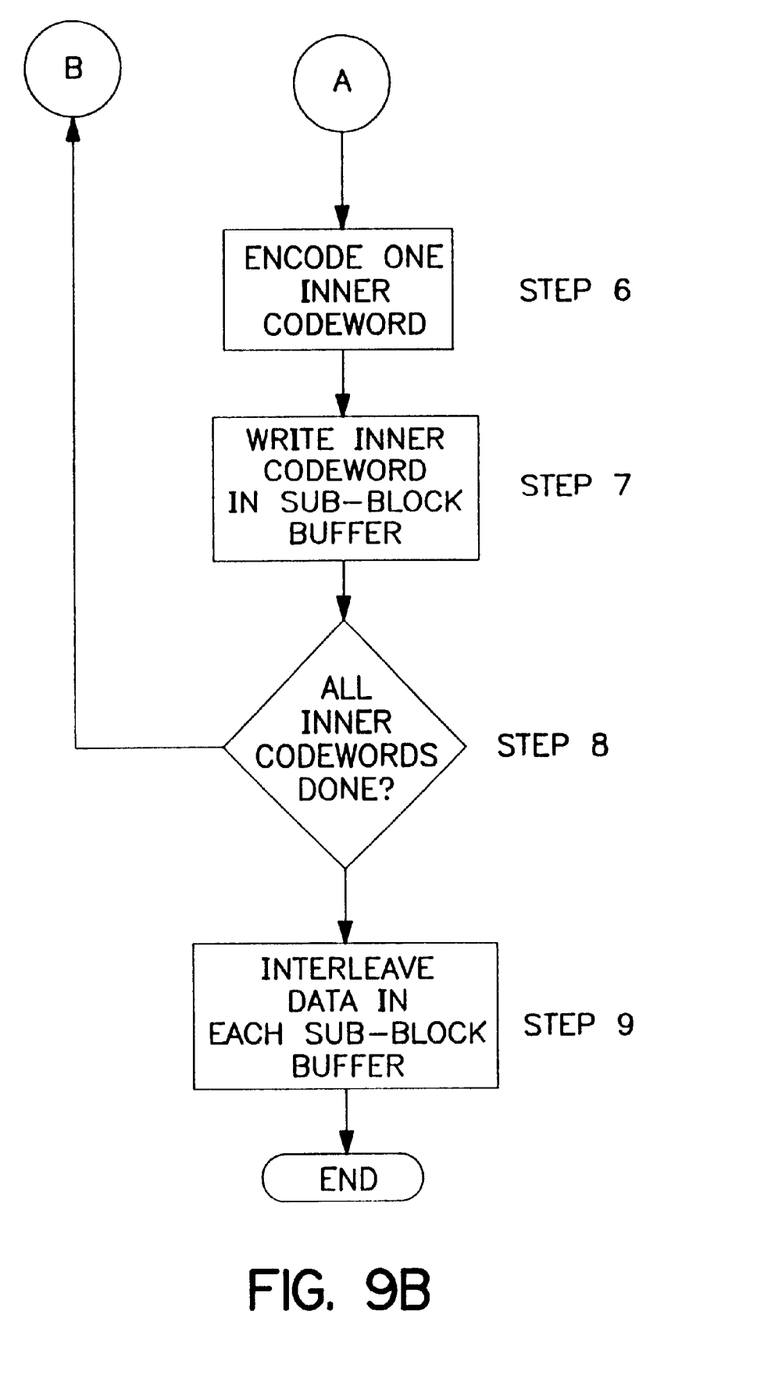
FIG. 9b is a flow diagram of a remaining portion of a process in accordance with the present invention.
Figure 10:
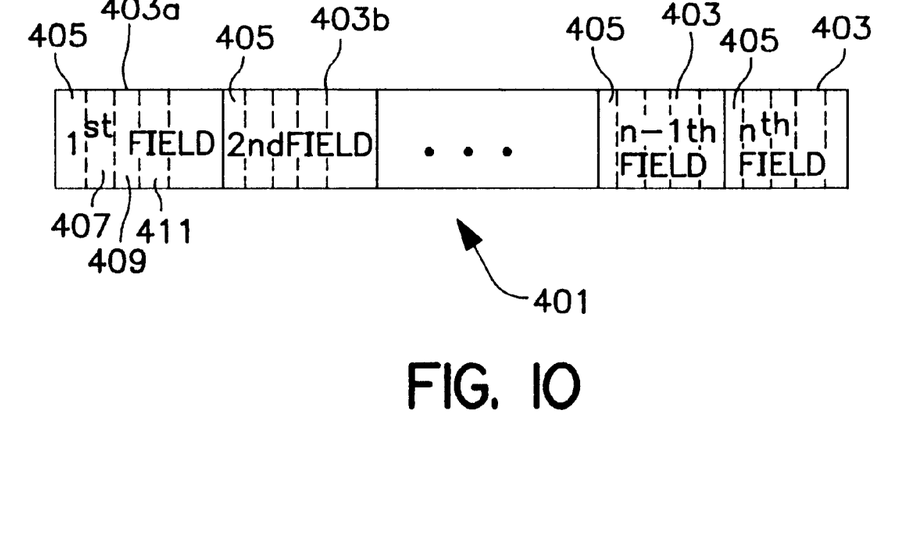
FIG. 10 is an illustration of a data file in accordance with one embodiment of the present invention.
Figure 11:
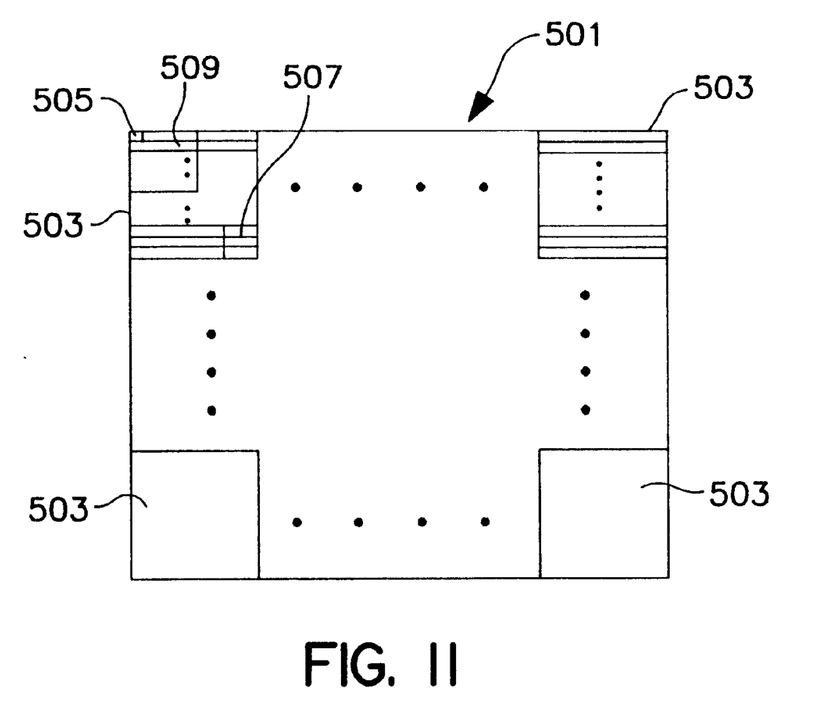
FIG. 11 is an illustration of an image-block buffer in accordance with one embodiment of the present invention.

A flowchart of the steps performed in accordance with one embodiment of the inventive method in which data is encoded and printed in a two dimensional print code is provided in FIGS. 9a and 9b. FIG. 10 is an illustration of a data file 401 stored in memory 310. FIG. 11 is a illustration of an image-block buffer 501 in accordance with one embodiment of the present invention. In one embodiment of the present invention, the image-block buffer 501 resides within memory 310. In accordance with the process illustrated in FIGS. 9a and 9b, data to be encoded are already present in a data file 401 in memory 310 and are accessible to the processor 308. In one embodiment of the present invention, the data to be recorded are stored sequentially in fields 403 within the data file 401. The data to be recorded in a first sub-block 203, 203' lie within a first field 403a at the beginning of the data file (i.e., at the lower addresses), the data to be recorded in a second sub-block 203, 203' lie in a second field 403b at the next block of addresses, etc. Data may be input into the memory by any conventional means, such as from a keyboard, optical scanner, or data storage device.

In a first step, data within a sub-field 405 of the first field 403a is read by the processor 308 from the memory 310. The sub-field data is then taken together with data from other similar sub-fields 405 of each other field 403 in the memory 310 (STEP 1). In one embodiment of the present invention, each sub-field 405 is equal in size to one symbol of the outer codeword to be generated in accordance with a conventional error correction coding method, such as Reed-Solomon encoding. The data read from each sub-field 405 are taken together and encoded into one outer codeword (STEP 2). It will be understood by those skilled in the art, that any error correction method may be used to encode the data into codewords. Two examples are provided above (i.e., Reed-Solomon, Bose-Chadhuri-Hocquenghem (BCH), and Hamming codes). However, other error correction methods are applicable to the present invention. For example, U.S. Pat. No. 5,321,246, issued to Blaum, et al. and assigned to the assignee of the present invention, and *Error Control Coding*, by Lin and Costelo, Published by Prentice Hall 1983, are incorporated by reference herein, provide examples of additional error correction codes.

The outer codeword generated in STEP 2 is stored in the image-block buffer 501 (STEP 3). In one embodiment of the present invention, the image-block buffer 501 preferably has the same configuration and size as the image-block 201 into which the data are to be recorded. Accordingly, the image-block buffer 501 is divided into a plurality of sub-block buffers 503. The outer codeword is recorded across a plurality of the sub-block buffers 503. In accordance with one embodiment, each outer codeword can be divided into a plurality of sub-words (such as symbols or bytes). In one embodiment of the present invention, the number of sub-words within each outer codeword is equal to the number of sub-block buffers 503 within one image-block buffer 501. One sub-word 505 of the outer codeword is stored in each sub-block buffer 503 of the image-block buffer 501. STEPs 1 through 3 are repeated for each additional group of sub-fields 407, 409, 411 until all of the data in the data file 401 has been encoded into outer codewords (STEP 4).

Next a portion 509 of the data stored in one sub-block buffer 503 of the image buffer 501 is read by the processor 308 (STEP 5). In one embodiment of the present invention, the portion 509 of the data read from the sub-block buffer 503 includes a plurality of the sub-words 505 of various outer codewords stored in one sub-block buffer 503. The amount of data read is equal to the amount of data to be encoded in one inner codeword. In one embodiment of the present invention, the boundaries that separate the sub-words 505 of the outer codewords recorded in the sub-block buffers 503 are not taken into account in selecting the portion 509 of data to be encoded into the inner codewords. Alternatively, the portion 509 of data is an integer multiple of the sub-words 505 stored in the sub-block 503, with boundaries that are coincident with the boundaries of the sub-words 505 included therein.

The portion 509 of data read in STEP 5 is then encoded into a first inner codeword (STEP 6). The inner codeword is recorded in the sub-block buffer 503 (STEP 7). In one embodiment of the present invention, the inner codeword overwrites the outer codeword data that was encoded into the inner codeword. However, it should be noted that the addition of the redundancy generated by the inner codeword will cause the inner codeword to be larger than the portion 509. Accordingly, when setting the dimensions of the image-block buffer, a section 507 of each sub-block buffer is preferably allocated and reserved for storing the inner codeword redundancy information.

In the preferred embodiment of the present invention, a plurality of portions 509 are encoded into inner codewords and recorded in each sub-block buffer 503. Each inner codeword is preferably recorded entirely within one sub-block buffer 503. Alternatively, inner codewords may be spread over a plurality of sub-block buffers 503. However, the greater difference the between the area over which an inner codeword is spread and the area over which an outer codeword is spread, the better the present invention will be able to correct both small scattered errors and large cluster errors. That is, in the preferred embodiment of the present invention, the inner codewords are recorded over a relatively small area (i.e., one sub-block) which makes the inner codewords well-suited to correcting small scattered random errors. The outer codewords are recorded over a relatively large area (i.e., spread over entire image-block), which makes the outer codewords well-suited to correcting larger cluster errors.

After recording the inner codeword in the sub-block buffer 503, STEPs 5 through 7 are repeated if not all of the outer codewords have been encoded into an inner codeword (STEP 8). This process repeats until each inner codeword for each sub-block has been generated. Once all of the data in each sub-block buffer 503 have been encoded into an inner codeword, sub-words (such as individual symbols) of each inner codeword are preferably interleaved with sub-words of other inner codewords from the same sub-block (see FIGS. 4 and 7)(STEP 9). By interleaving sub-words of each inner codeword with sub-words of each other codeword from the same sub-block, the sub-words of each inner codeword are preferably spread evenly over the entire area of the sub-block. Therefore, there is a greater chance that no more than a single sub-word of each inner codeword will be corrupted by a scattered random error. Accordingly, there is a greater chance that the error will be correctable using only the inner codewords. In an alternative embodiment of the present invention the step of interleaving the inner codewords is performed immediately after each of the inner codeword of one sub-block have been generated.

From the above description of the present invention, it will be clear to one skilled in the art that the present invention provides a method and apparatus for encoding data in a two dimensional array format, such that both small scattered random errors and large cluster errors can be corrected with a minimum amount of overhead. That is, in the example provided in FIGS. 5–7, the present invention can recover from errors in one module in each of the four inner codewords recorded in each sub-block. Accordingly up to 256 scattered errors can be corrected by adding 512 additional modules to the image-block 201. It will be clear to those skilled in the art that additional redundancy will provide additional error correction capability. The optimum redundancy and encoding technique is best determined on a case by case basis. Once scattered small errors have been corrected by using the inner codewords, the outer codewords are used to correct large cluster errors in which a large area of a particular sub-block has been corrupted. That is, returning to the example provided in FIGS. 5–7, one entire sub-block 203 can be recovered assuming that any other errors in each other sub-block can be recovered using the inner codewords. Of course, more than one cluster error can be corrected if each is smaller than one sub-block, as long as no more than the number of errors that can be recovered in one codeword have occurred in the symbols of any one codeword.

It will be clear to one of ordinary skill in the art that the process of reading data from an image-block will be the reverse of the process described above and illustrated in FIGS. 9a and 9b. That is, the information that is encoded in an image block is read into an image block buffer. The inner codewords are decoded first and stored back in the image buffer. Any scattered random errors that are detected by the inner codewords are corrected if they are sufficiently small. Once each of the inner codewords has been decoded (if possible), the first outer codeword can be decoded (if possible). Since the inner codewords have already corrected any scattered random errors that may have been present, the outer codewords have been improved by the error detection and correction feature of the inner codewords. The result of decoding each outer codeword is stored in the image buffer. Each other outer codeword is decoded in the same manner until all of the outer codewords have been decoded.

Figure 12:
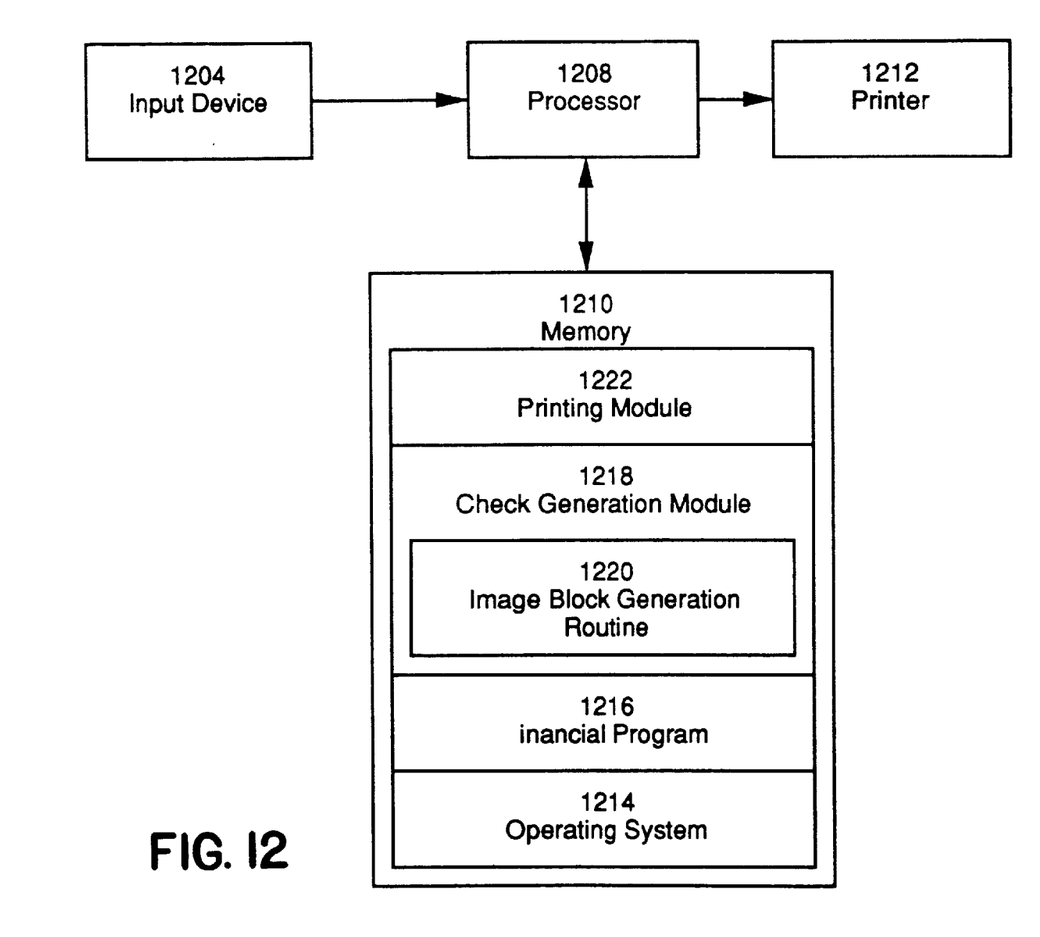

A system for generating checks in accordance with the present invention is shown in FIG. 12. Data, typically regarding financial transactions, is entered via input device 1204. Input device 1204 may be a manual input device, such as, for example, a keyboard, mouse, etc., or it may be an automated input device, such as a tape drive, floppy or removable media rigid disk drive, network interface, etc. The entered data is received by processor 1208, which processes it under the control of financial program 1216. Financial program 1216 may be one of the commonly available personal finance programs, a business finance program or a custom financial program. All of these programs receive data regarding financial transactions, process them and store the results. Typically, such programs run under the control of an operating system 1214. Financial program 1216 contains a check generation module which generates checks. The purpose of the check varies depending on the type of transaction data received by financial program 1216. For example, the transaction may relate to personal expenditures, business accounts payable, business payroll, etc. In accordance with the present invention, check generation module 1218 generates checks which contain the transaction data encoded in an image block. To generate the encoded image block, module 1218 contains image block generation routine 1220, which implements the process described in FIGS. 9a–b above. Check generation module 1218 then transmits the image block and other data which are to appear on the check to printing module 1222. Printing module 1222 formats the received data for printing and causes processor 1208 to transmit the formatted print data to printer 1212. Printer 1212 then prints the check.

A number of embodiments of the present invention have been described. Nevertheless, it will be understood that various modifications may be made without departing from the spirit and scope of the invention. For example, the present invention is described as using a "processor" and a "memory". In accordance with the present invention, the processor may be a programmable microprocessor or other programmable computing device, a state machine, or dedicated hardware. The memory may be any means for storing information, such as magnetic data storage device, random access memory fabricated in a semiconductor integrated circuit, dynamic random access memory, optical memory device, or any other means for storing information. Furthermore, any error correction code may be used to encode data in a codeword. Still furthermore, an image-block in accordance with the present invention may have any dimensions and may have any number of sub-blocks. Each sub-block may include any number of inner codewords. Furthermore, the image-block may have any number of outer codewords. Still further, any particular interleaving scheme may be used in order to physically separate bytes of one inner codeword. Still further, steps of the inventive process may be carried out in any order, as long as the previous step is not critical to the operation of the next step. For example, the data is preferably encoded into inner codewords after encoding the data into outer codewords. However, in an alternative embodiment of the present invention, the order is reversed.

Accordingly, it is to be understood that the invention is not to be limited by the specific illustrated embodiment but only by the scope of the appended claims.

What is claimed is:

1. A machine-readable check comprising:
   a check; and
   an image block printed on the check, wherein the image block comprises:
      a plurality of sub-blocks, each sub-block having a plurality of modules, each module representing a unit of the data;
      an outer error correction codeword recorded across the plurality of sub-blocks such that at least some of the modules within at least two of the sub-blocks, taken together, represent the entire outer error correction codeword the outer error correction codeword having an encoded part; and
      a first inner error correction codeword encoding part of the recorded outer correction codeword, recorded in those the same sub-blocks in which is recorded the encoded part of the recorded outer error correction codeword.

2. The machine-readable check of claim 1, wherein the part of the outer correction codeword recorded in any one sub-block is less than the codeword is capable of correcting.

3. The machine-readable check of claim 2, wherein the entire inner codeword is recorded within one sub-block.

4. The machine-readable check of claim 1, wherein the image block is a two dimensional print code.

5. The machine-readable check of claim 4, wherein a module represents a logical binary value based upon the relative shading of that module.

6. The machine-readable check of claim 1, further including a second inner error correction codeword, having encoded part of the outer error correction codeword not encoded in the first inner error correction code, recorded in those sub-blocks in which is recorded that part of the outer error correction codeword that is encoded in the second inner error correction codeword.

7. The machine-readable check of claim 6, wherein the first and second error correction codewords are interleaved such that parts of the first inner error correction codeword are spaced apart from other parts of the first inner error correction codeword, and parts of the second inner error correction codeword are spaced apart from other parts of the second inner error correction codeword.

8. The machine-readable check of claim 7, wherein the parts of the first and second error correction codewords are symbols.

9. The machine-readable check of claim 8, wherein the parts of the first and second error correction codewords are represented by individual modules.

10. The machine-readable check of claim 6, wherein the inner error correction codeword is a Hamming codeword, and the outer error correction codeword is a Reed-Solomon codeword.

11. The machine readable check of claim 1, wherein at least one of the plurality of modules is essentially circular.

12. The machine readable check of claim 1, wherein at least one of the plurality of modules is essentially triangular.

13. The machine readable check of claim 1, wherein at least one of the plurality of modules is essentially octagonal.

14. The machine readable check of claim 4, wherein each module represents a plurality of binary bits.

15. The machine readable check of claim 14, wherein each module is printed in one color from among a finite set of possible colors, wherein each color represents a state of the plurality of binary bits.

16. The machine readable check of claim 9, wherein each module represents a plurality of binary bits.

17. The machine readable check of claim 16, wherein each module is printed in one color from among a finite set of possible colors, wherein each color represents a state of the plurality of binary bits.

18. The machine readable check of claim 10, wherein each module represents a plurality of binary bits.

19. The machine readable check of claim 18, wherein each module is printed in one color from among a finite set of possible colors, wherein each color represents a state of the plurality of binary bits.

* * * * *